United States Patent [19]

Straus

[11] Patent Number: 4,527,823
[45] Date of Patent: Jul. 9, 1985

[54] BATTERY CARRIER

[76] Inventor: Stephen H. Straus, 567 Livingston, St. Paul, Minn. 55107

[21] Appl. No.: 520,836

[22] Filed: Aug. 5, 1983

Related U.S. Application Data

[63] Continuation-in-part of Ser. No. 401,531, Jul. 26, 1982, abandoned.

[51] Int. Cl.³ ............................ B65G 7/12; B66C 1/44
[52] U.S. Cl. ..................................... 294/16; 294/118; 294/164; 294/903
[58] Field of Search .................. 294/15, 16, 28, 31 R, 294/62, 63 B, 106, 113, 118, 164, 165, 169

[56] References Cited

U.S. PATENT DOCUMENTS

| | | | |
|---|---|---|---|
| 282,134 | 7/1883 | Ward | 294/16 X |
| 1,221,718 | 4/1917 | Fox | 294/118 |
| 1,260,111 | 3/1918 | Wickersham | 294/28 |
| 1,301,309 | 4/1919 | Parent | 294/28 |
| 1,313,752 | 8/1919 | Smith | 294/28 |
| 1,344,174 | 6/1920 | Clogston | 294/118 |
| 1,439,202 | 12/1922 | Taylor | 294/28 |
| 1,561,453 | 11/1925 | Althen | 294/28 |
| 1,669,641 | 5/1928 | Zeitler | 294/118 |
| 2,367,889 | 1/1945 | Radtke | 294/16 |
| 2,775,476 | 12/1956 | Brown | 294/63 B X |
| 2,828,155 | 3/1958 | Schwankl | 294/16 |
| 2,847,243 | 8/1958 | Hare | 294/16 |
| 2,991,114 | 7/1961 | Robinson et al. | 294/118 |
| 3,153,554 | 10/1964 | Beihl | 294/28 |
| 4,109,952 | 8/1978 | Monzain | 294/16 |
| 4,215,889 | 8/1980 | Rayburn | 294/16 |

FOREIGN PATENT DOCUMENTS

| | | | |
|---|---|---|---|
| 1274687 | 9/1961 | France | 294/63 B |
| 201149 | 1/1939 | Switzerland | 294/16 |
| 382716 | 11/1932 | United Kingdom | 294/63 B |

Primary Examiner—Johnny D. Cherry
Attorney, Agent, or Firm—Jacobson and Johnson

[57] ABSTRACT

A battery carrier for lifting and carrying electrical storage batteries with the battery carrier having a pair of members for encircling portions of the battery case and a pair of pivotable handles connected thereto that can be squeezed together so that as the operator lifts the battery upward the squeezing force on the members forces the members into frictional contact with the vertical edges of the battery to permit the operator to lift and carry the battery.

2 Claims, 7 Drawing Figures

BATTERY CARRIER

CROSS REFERENCE TO RELATED APPLICATIONS

This application is a continuation-in-part of U.S. patent application Ser. No. 401,531 titled "Battery Carrier", filed July 26, 1982, now abandoned.

FIELD OF THE INVENTION

This invention relates generally to battery carriers and, more specifically, to improvements to battery carriers for carrying different types and sizes of batteries without damaging the battery case yet securely holding the battery.

DESCRIPTION OF THE PRIOR ART

The concept of battery carriers is old in the art. Probably the most well known type of battery carrier is the strap type carrier in which a nonconducting strap has a metal tab on each end of the strap with the opening in the metal tabs being slightly larger than the diameter of the battery terminal posts. The larger opening permit the metal tabs to be loosely fitted over the battery terminal posts. The upward lifting motion on the strap causes the metal tabs to bite into the battery terminal posts so that one can lift the battery using only the battery terminal posts as a support. The strap type of battery carriers have the advantage of providing a very simple structure; however, they have the limitation that they are only usable with batteries having terminal posts on the top of the battery. In addition, if the metal tabs do not bite securely into the terminal posts, the battery may drop to the floor which may break the battery as well as spill corrosive battery acids over the user and the floor.

There are still other types of battery holders which have been used for carrying articles or the like as identified by the following art:

The Sommer U.S. Pat. No. 1,569,405 shows a lifter for fruit jars or the like in which a pair of handles are squeezed together to bring a pair of jaws underneath the lip or bead of a jar. With the jaws engaging the lip or bead of the jar the operator can lift the jar upward.

The Coleman U.S. Pat. No. 3,374,026 shows a meat tongs having a pair of inward sloping lower sections for performing a scooping action under meat or the like to enable the operator to lift the meat after the operator has clamped the handles together.

The Coleman U.S. Pat. No. 3,269,764 shows a pair of tongs for removing food and meats from an oven with the tongs having a scissor-like action. The meat support members of the Coleman tongs extend inward and upward to permit engaging the underside of the food article that is to be lifted from the roasting pan or the like.

The Fredrickson U.S. Pat. No. 3,820,837 shows a battery carrier for use in lifting batteries with his carrier having pressure pads which engage the end faces of the battery. The upward lifting action of the Fredrickson carrier forces his pressure pads inward to where they engage the side faces of the battery. The Fredrickson carrier also requires a lip on the top of the battery for the pressure pads to engage.

The Rayburn U.S. Pat. No. 4,215,889 shows a tool for lifting and carrying auto batteries which has a scissor-like action and a pair of pressure pads with elongated ridges for gripping the end faces of the battery. Through the operator lifting action the Rayburn carrier provides lateral forces on the pressure pads so that the elongated gripping ridges bite into the end faces of the battery; however, such carriers cause problems since if the use is not careful, the gripping ridges can penetrate or damage the battery case.

The Breite U.S. Pat. No. 4,055,364 shows a similar type of tool for lifting batteries laterally where forces are applied on the end faces of the battery to lift the battery upward.

BRIEF SUMMARY OF THE INVENTION

Briefly, the present invention comprises an improved battery carrier which firmly grasps the battery case with the battery carrier including a pair of U-shaped handles that are pivotally connected to each other and a pair of U-shaped members that can be slid along the sides of the battery. When the handles are squeezed together the U-shaped members frictionally grip a portion of the edges of the battery base. Since the edges of the battery comprises one of the strongest parts of the battery case, the members can form firm frictional contact with the battery case to permit the operator to lift the battery.

DESCRIPTION OF THE PREFERRED EMBODIMENT

Figure 1:
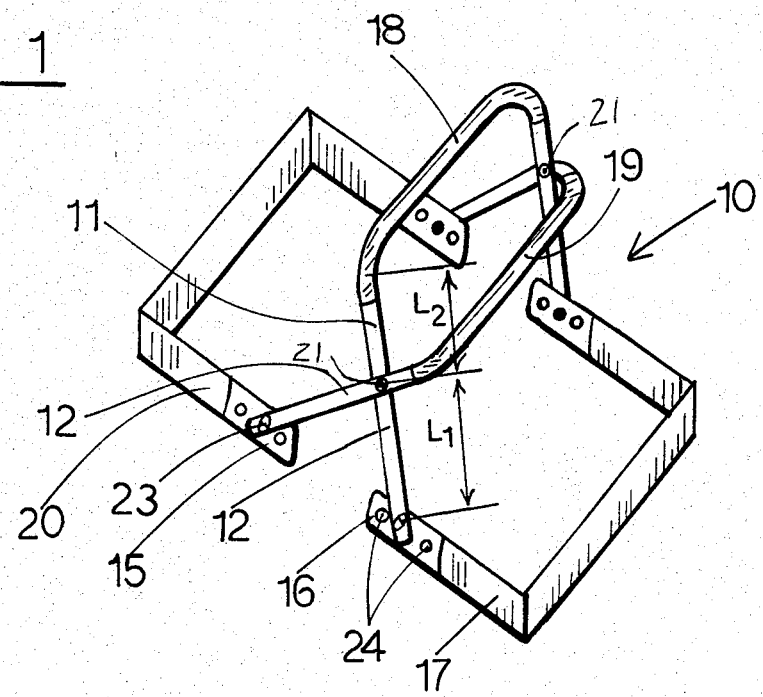
FIG. 1 is a perspective view of my battery carrier in the open position.

Referring to FIG. 1 reference numeral 10 generally designates the battery carrier of the present invention which comprises a pair of U-shaped handles 11 and 12 which pivot in a scissor-like action about pivot points 21. Attached to the ends of U-shaped handle 11 is a U-shaped band 16 and similarly attached to the ends of U-shaped handle 12 is a U-shaped band 15. Bands 15 and 16 are made of a thin, yet sufficiently rigid material which can support the tensile forces necessary to grip and lift a battery. In the embodiment shown in FIG. 1 band 15 contains an electrical insulated coating 20 and, similarly, band 16 contains an electrical insulating coating 17. In the preferred embodiment bands 15 and 16 are made of metal for purposes of achieving strength with narrow thickness. To insure that one does not accidentally short the battery when using the metal bands, electrical insulating coatings are placed on the bands to prevent battery terminal contact that may cause battery shorting and arcing. However, it is envisioned that bands 15 and 16 could also be made from a suitable nonconductive material.

Handles 11 and 12 are similarly made of a material such as steel or the like and also respectively contain electrical insulating coatings 18 and 19 in the hand grip area. The electrical insulating coatings 18 and 19 can be rubber or any other suitable nonconductive polymer plastic or the like. Although metal handles are preferred for strength, it is envisioned other suitable nonconducting materials could be used. It should be pointed out my battery carrier functions to lift and carry the batteries without the electrical insulating coating but the electrical insulated coatings prevent accidental battery shorting.

Figure 2:
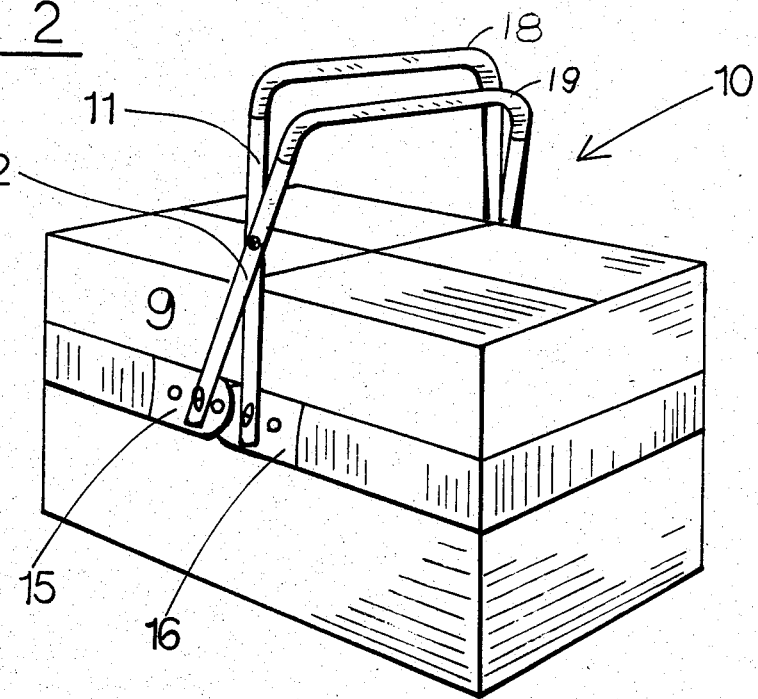
FIG. 2 shows a battery carrier gripping a battery.

FIG. 1 shows the junction between the two handles 11 and 12 is located a distance L1 from the bottom member and a distance L2 from the top with L1 being slightly longer than L2 with the spacing of the junctions between handles 11 and 12 being such that when battery carrier 10 is in the lifting position as shown in FIG. 2, handle 12 is slightly lower than handle 11. Thus, when handles 11 and 12 are forced together, the top part of handle 12 is below the top part of handle 11 which allows the user to provide a comfortable lifting and squeezing action on handles 11 and 12.

Each of the ends of bands 15 and 16 is provided with a plurality of openings and a removable fastener such as a bolt and wing nut for fastening bands 15 and 16 to handles 11 and 12. The multiple openings permit the operator to adjust the band spacing so that battery carrier 10 can be adapted to carry larger or smaller batteries.

In order to appreciate the operation of my battery carrier reference should be made to FIG. 1 and FIG. 2. In FIG. 1 carrier 10 is shown in the open position and in FIG. 2 carrier 10 is shown in the lifting and carrying position. Note, FIG. 1 shows bands 15 and 16 are sufficiently rigid so that they support themselves in a U-shape. This is advantageous since it allows the battery carrier bands to be inserted around a car battery from above since the bands will hold their shape and position as one lowers bands 15 and 16 around battery 9. In operation, the operator slips bands 15 and 16 along the sides of the battery and generally positions bands 15 and 16 on the top half of battery case 9 (FIG. 2). Next, the operator grasps handles 11 and 12 and forces the handles together which produces a lateral squeezing action of bands 15 and 16 on the outer edges of battery 9. In most instances the primary engagement of bands 15 and 16 is at the edges of the battery since the edges of the battery are rigid and have sufficient strength so as not to flex inward as the sides and the face of the battery. Thus, battery carrier bands 15 and 16 form a firm contact between the carrier and the battery to enable the operator to lift the battery. In addition, no teeth or special gripping members are required on the bands since the frictional forces between bands 15 and 16 and battery 9 are sufficient to firmly grip the battery 9 and prevent battery 9 from slipping out of carrier 10. Furthermore, no stop is required on the battery since the edges or corners of conventional batteries are sufficiently strong to entirely support the weight of the battery through lateral application of force to the edges of the battery.

Figure 3:
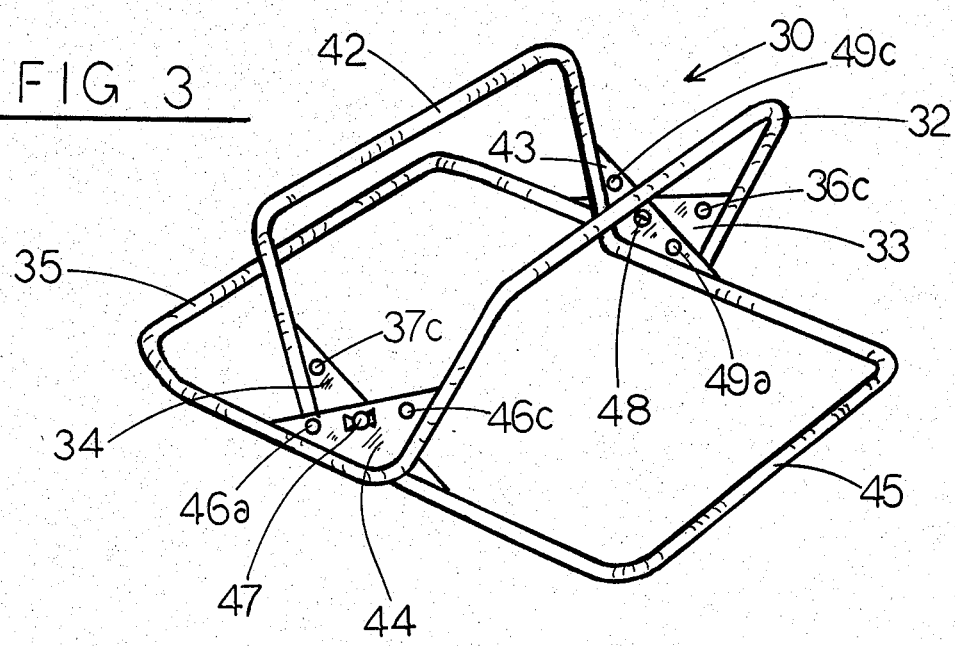
FIG. 3 is a perspective view of an alternate embodiment of my battery carrier in the open position.

Referring to FIG. 3 reference numeral 30 generally designates an electrical nonconducting rod frame battery carrier which comprises a pair of U-shaped handles 32 and 42 which pivot in a scissor-like action about pivot points formed by bolts 47 and 48. U-shaped handle 32 connects to a U-shaped cylindrical battery grip member 35 to form a first continuous angled loop member and similarly attached to the ends of U-shaped handle 42 is a U-shaped cylindrical battery grip member 45 to form a second continuous angled loop member. The angled loop members are preferably made of a nonconducting yet sufficiently rigid material which can support the tensile forces necessary to grip and lift a battery. One such material that works well is polycarbonate with fiberglass.

In the embodiment shown in FIG. 3 the handles 32 and 42 are preferably made from one piece of material. Similarly, handle 42 and battery grip member 35 are preferably made of electrical insulating material or if from an electrical conducting material have an integral insulate coating thereon. Located at the junctures of the battery grip member 35 and handle 32 is a first gusset 44 and a second gusset support 33 containing a plurality of openings therein. Similarly, the junction of handle 42 and battery grip member 45 contain a first gusset support 34 and a second gusset support 43. Each of the gusset supports contain a plurality of opening spaces along the outer edges. For example, gusset support 43 contains a first opening 49a, a central opening having bolt 48 therein and an end opening 49c. Similarly, gusset support 44 contains a first opening 46a, a central opening having bolt 48 therein and a third opening 46c. Likewise, the gusset support member 34 also contains a series of similar openings.

In operation a bolt or similar pivotal connector is placed through one of the openings in adjacent gusset members to provide a pivotal action between handles 32 and 42 and battery grip members 35 and 45.

Figure 4:
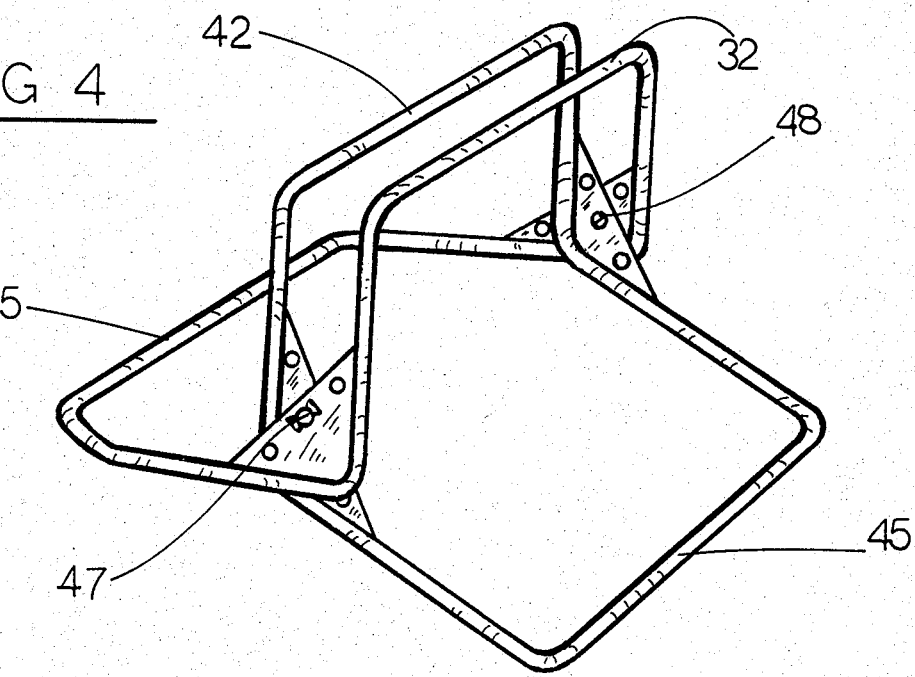
FIG. 4 shows the embodiment of FIG. 3 in a position for gripping a battery.

FIG. 4 illustrates how the battery grip members 35 and 45 can be pivoted about pivot bolts 47 and 48 located in the central position of each of the gusset support members to engage the battery. Note, in the battery engaging position handles 32 and 42 are substantially vertical and battery members 35 and 45 are downward and would be in the position of engaging the ends of the battery.

Figure 5:
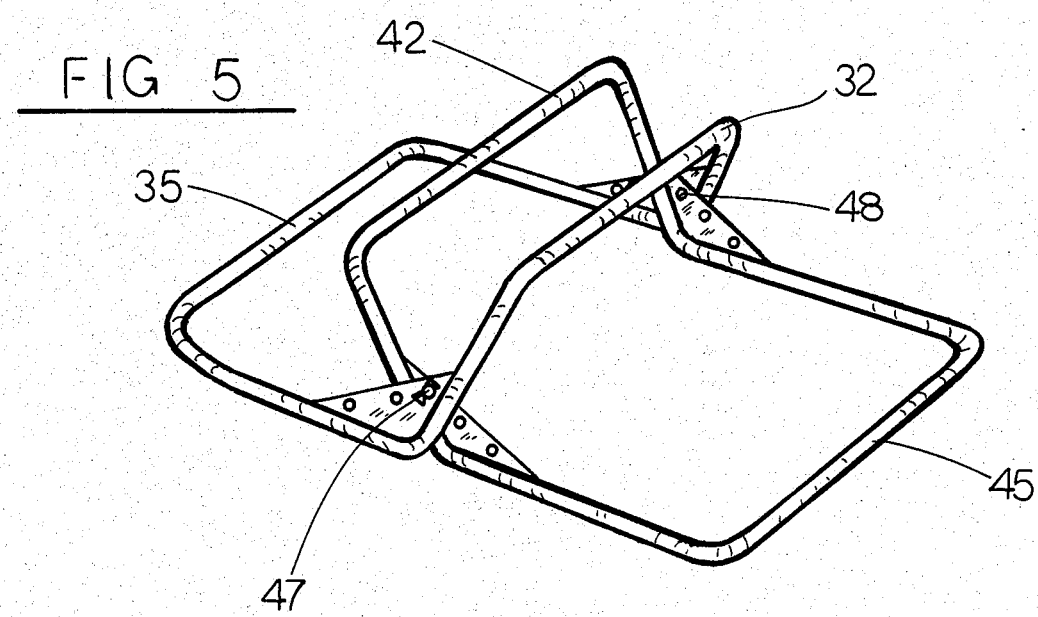
FIG. 5 shows the embodiment of FIG. 4 in a position to accommodate a different size battery.

Referring to FIG. 5 the adjustability feature of the present invention is illustrated by the placement of pivot bolts 47 and 48 in different openings in the gusset members. That is, by using different openings for pivot members it causes the battery holder to have a larger space between battery grip members 35 and 45 so that a larger battery can be accommodated.

Similarly, placing pivot bolts 47 and 48 in the openings in the opposite end of the gussets causes battery grip members 35 and 45 to become closer together to thereby permit battery carrier 30 to accommodate smaller batteries.

Figure 6:
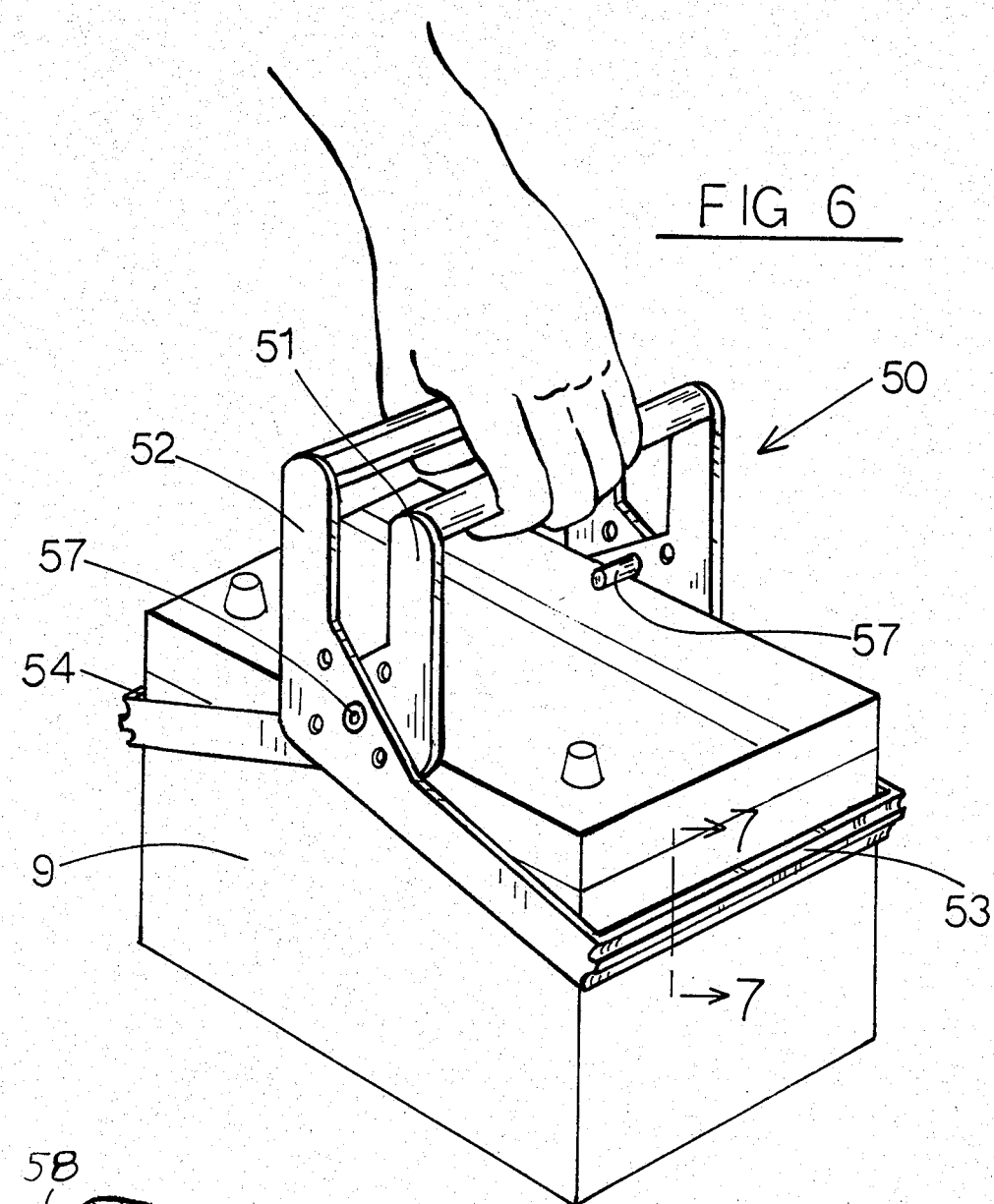
FIG. 6 shows a further embodiment of my battery carrier.

Referring to FIG. 6 there is shown a perspective view of battery carrier 50 engaging a battery 9. Battery carrier 50 is similar to battery carrier 30 except that member 51 is comprised of flat material rather than cylindrical material and each of the battery grip members 53 and 54 contain a plurality of members or ridges 58 for gripping the battery case. In addition, FIG. 6 shows how pivot members 57 extend inward so that they act as a stop to prevent the battery carrier 50 from sliding too far down on battery 9. This prevents the hand from coming into contact with any acid that may be on the top of battery 9.

Figure 7:
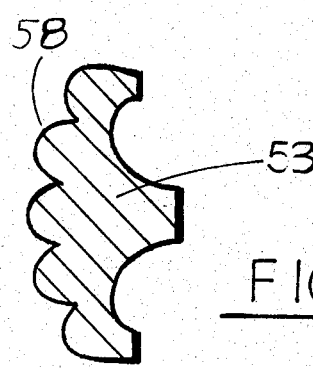
FIG. 7 shows a cross sectional view of the battery grip member of FIG. 6.

FIG. 7 shows a cross sectional view of battery grip member 53 to illustrate the ridges 58 for grasping the ends of battery 9.

I claim:

1. A battery carrier or the like made from a nonelectrical conducting material comprising:
    a first handle having an area for a user to grasp;
    said first handle having a first battery gripping member attached thereto and having sufficient length to extend beyond the end wall of a battery to be carried, said battery gripping member having a straight section with a plurality of ridges extending therealong for grippingly engaging a portion of a battery, said first handle and said first battery gripping member forming a first continuous loop;

a second handle having a second battery gripping member attached thereto and having sufficient length to extend beyond the end wall of a battery to be carried, said second battery gripping member having a straight section, a plurality of ridges extending therealong for grippingly engaging a portion of the battery, said second handle and said second battery gripping member forming a second continuous loop, said second handle and said first handle pivotally connected to each other; and said battery gripping members characterized by each being sufficiently rigid to support itself yet sufficiently flexible to conform to a battery to be lifted whereby an operator can lift or carry a battery by forcing said plurality of the ridges of said first battery gripping member and said plurality of the ridges of said second battery gripping member against opposite ends of a battery, said battery carrier including a first pivotal member connecting said first handle to said second handle and a second pivotal member connecting said first handle to said second handle, said pivotal members extending sufficiently inward from said first handle and said second handle to form a stop to prevent said first handle and said second handle from coming in contact with the top of a battery located in said battery carrier.

2. The invention of claim 1 wherein said first handle and said first battery gripping member are formed from a single piece of material.

* * * * *